(12) United States Patent
Bulan et al.

(10) Patent No.: US 9,704,201 B2
(45) Date of Patent: Jul. 11, 2017

(54) METHOD AND SYSTEM FOR DETECTING UNINSURED MOTOR VEHICLES

(71) Applicant: Xerox Corporation, Norwalk, CT (US)

(72) Inventors: Orhan Bulan, Henrietta, NY (US); Aaron M. Burry, Ontario, NY (US); Abu S. Islam, Rochester, NY (US); Peter Paul, Penfield, NY (US); David Martin Todd Jackson, Arlington, VA (US)

(73) Assignee: Conduent Business Services, LLC, Dallas, TX (US)

( * ) Notice: Subject to any disclaimer, the term of this patent is extended or adjusted under 35 U.S.C. 154(b) by 324 days.

(21) Appl. No.: 14/446,938

(22) Filed: Jul. 30, 2014

(65) Prior Publication Data

US 2016/0035037 A1     Feb. 4, 2016

(51) Int. Cl.
    *G06K 9/00*     (2006.01)
    *G06Q 40/08*     (2012.01)
    *G06K 9/32*     (2006.01)
    *G06K 9/46*     (2006.01)

(52) U.S. Cl.
    CPC .......... *G06Q 40/08* (2013.01); *G06K 9/3258* (2013.01); *G06K 9/4661* (2013.01)

(58) Field of Classification Search
None
See application file for complete search history.

(56) References Cited

U.S. PATENT DOCUMENTS

| | | | |
|---|---|---|---|
| 6,233,563 B1 | 5/2001 | Jefferson et al. | |
| 6,437,690 B1 | 8/2002 | Okezie | |
| 6,868,386 B1 | 3/2005 | Henderson et al. | |
| 7,302,085 B2 * | 11/2007 | Sasaki | G06K 9/3258 348/135 |
| 7,701,363 B1 | 4/2010 | Zlojutro | |
| 8,373,554 B2 | 2/2013 | Cai et al. | |
| 8,433,588 B2 | 4/2013 | Willis et al. | |
| 8,447,112 B2 | 5/2013 | Paul et al. | |
| 8,737,690 B2 | 5/2014 | Bulan et al. | |

(Continued)

OTHER PUBLICATIONS

Kodwani, "Automatic vehicle detection, tracking and recognition of license plate in real time videos", 2013.*

(Continued)

*Primary Examiner* — Soo Jin Park
(74) *Attorney, Agent, or Firm* — Kermit D. Lopez; Luis M. Ortiz; Ortiz & Lopez, PLLC

(57) ABSTRACT

A video sequence can be continuously acquired at a predetermined frame rate and resolution by an image capturing unit installed at a location. A video frame can be extracted from the video sequence when a vehicle is detected at an optimal position for license plate recognition by detecting a blob corresponding to the vehicle and a virtual line on an image plane. The video frame can be pruned to eliminate a false positive and multiple frames with respect to a similar vehicle before transmitting the frame via a network. A license plate detection/localization can be performed on the extracted video frame to identify a sub-region with respect to the video frame that are most likely to contain a license plate. A license plate recognition operation can be performed and an overall confidence assigned to the license plate recognition result.

20 Claims, 12 Drawing Sheets

(56) References Cited

U.S. PATENT DOCUMENTS

| | | | |
|---|---|---|---|
| 8,744,132 | B2 | 6/2014 | Bulan et al. |
| 9,286,516 | B2* | 3/2016 | Bulan ................ G06K 9/00624 |
| 2004/0189493 | A1* | 9/2004 | Estus ........................ G08G 1/20 340/988 |
| 2004/0252193 | A1* | 12/2004 | Higgins ............... G08G 1/0175 348/149 |
| 2009/0150267 | A1* | 6/2009 | Sherman ................ G06Q 10/10 705/30 |
| 2009/0202105 | A1 | 8/2009 | Castro Abrantes et al. |
| 2012/0155712 | A1* | 6/2012 | Paul ......................... G06K 9/00 382/105 |
| 2012/0173128 | A1 | 7/2012 | Peeler |
| 2013/0033386 | A1 | 2/2013 | Zlojutro |
| 2013/0265419 | A1 | 10/2013 | Bulan et al. |

OTHER PUBLICATIONS

Wang et al., "A cascade framework for a real-time statistical plate recognition system", IEEE Transactions on information forensics and security, vol. 2, No. 2, Jun. 2007.*

Traffic cameras detecting unregistered and uninsured vehicles, Department of Planning, Transport and Infrastructure, http://www.sa.gov.au/topics/transport-travel-and-motoring/motoring/vehicles-and-registration/vehicle-registration/traffic-camera-detection, updated Apr. 10, 2014, 2 pages.

"Department Has Taken Steps to Improve the Detection of Uninsured Motorists," OPPAGA Information Brief (Aug. 2004), Report No. 04-52, project conducted by Johnson, C. and Taylor, S., 4 pages.

Lo, B.P.L. et al., "Automatic Congestion Detection System for Underground Platforms," Proceedings of the 2001 International Symposium on Intelligent Multimedia, Video and Speech Processing (May 2-4, 2001), Hong Kong, pp. 158-161.

Makarov, A. et al., "Intrusion Detection Using Extraction of Moving Edges," Proceedings of the 12$^{th}$ IAPR International Conference on Pattern Recognition (1994) vol. 1—Conference A: Computer Vision; Image Processing, Oct. 9-13, pp. 804-807.

Anagnostopoulos, C. N. E. et al., "A License Plate-Recognition Algorithm for Intelligent Transportation System Applications," IEEE Transactions on Intelligent Transportation Systems (2006) 7(3):377-392.

U.S. Appl. No. 14/227,035, filed Mar. 27, 2014, Li et al.

Case Law 4 Cops, http://www.caselaw4cops.net/articles/traffic_cameras.html, printed Jul. 25, 2014, 2 pages.

Cucchiara, R. et al., "Improving Shadow Suppression in Moving Object Detection with HSV Color Information," Proc. of IEEE Intelligent Transportation Systems (Aug. 25-29, 2001), Oakland, CA, pp. 334-339.

Estimated Rate of Uninsured Motorists, http://www.insurance.ca.gov/0400-news/0200-studies-reports/1200-uninsured-motorist/, printed Jul. 25, 2014, 1 page.

Florida Has Among Highest Uninsured Motorists Rates in the U.S., http://www.flains.org/fact-book-flcmembermenu-70/905-auto-insurance/5082-florida-has-among-highest-uninsured-motorists-rates-in-the-us.html, printed Jul. 25, 2014, 2 pages.

Horn, B. K. P. et al., "Determining Optical Flow," Artificial Intelligence (1981) 17:185-203.

Huang, Y.-W. et al., "Survey on Block Matching Motion Estimation Algorithms and Architectures with New Results," Journal of VLSI Signal Processing (2006) 42:297-320.

Oliver, N. M. et al., "A Bayesian Computer Vision System for Modeling Human Interactions," IEEE Transactions on Pattern Analysis and Machine Intelligence (2000) 22(8):831-843.

The Number of Uninsured Drivers Continues to Rise, http://www.genins.com/img/~www.genins.com/the%20number%20of%20uninsured%20drivers%20continues%20to%20rise.pdf, printed Jul. 25, 2014, 1 page.

* cited by examiner

| YEAR | REGISTERED VEHICLES | | INSURED VEHICLES | | RATE OF UNINSURED MOTORISTS |
|---|---|---|---|---|---|
| | NUMBER* | % CHANGE ** | NUMBER | % CHANGE ** | |
| 1995 | 20,197,092 | | 14,164,574 | | 29.87% |
| 1996 | 20,323,829 | 0.6% | 14,620,180 | 3.2% | 28.06% |
| 1997 | 20,727,274 | 2.0% | 16,557,565 | 13.3% | 20.12% |
| 1998 | 21,043,560 | 1.5% | 17,604,603 | 6.3% | 16.34% |
| 1999 | 21,593,468 | 2.6% | 18,512,755 | 5.2% | 14.27% |
| 2000 | 22,266,982 | 3.1% | 19,107,564 | 3.2% | 14.19% |
| 2001 | 22,793,631 | 2.4% | 19,806,658 | 3.7% | 13.10% |
| 2002 | 23,331,631 | 2.4% | 20,003,536 | 1.0% | 14.26% |
| 2003 | 23,987,027 | 2.8% | 20,550,067 | 2.7% | 14.33% |
| 2004 | 24,672,633 | 5.7% | 21,113,403 | 5.5% | 14.43% |

FIG. 1

METHOD AND SYSTEM FOR DETECTING UNINSURED MOTOR VEHICLES

FIELD OF THE INVENTION

Embodiments are generally related to technologies for detecting uninsured motor vehicles. Embodiments are also related to the fields of image-processing and video analytics. Embodiments are additionally related to the acquisition of video from roads, highways, toll booths, red lights, intersections, and so forth.

BACKGROUND

Vehicle insurance can be purchased for cars, trucks, motorcycles, and other road vehicles. Vehicle insurance provides financial protection against a physical damage and/or a bodily injury resulting from a traffic collision and against liability that can also arise there from. The specific terms of vehicle insurance vary with legal regulations in each region. Such vehicle insurance may additionally offer financial protection against theft of the vehicle and possibly damage to the vehicle sustained from things other than traffic collisions.

In addition to causing significant problems to the public for collecting damages in traffic accidents, uninsured vehicles cause important loss of revenue for governments and insurance companies. FIG. 1 illustrates a sample table 100 containing example data regarding the estimated number and rate of uninsured vehicles in California from 1995 to 2004. Similar statistics can also be obtained for other states. In 2007, for example, the uninsured motor vehicle rates for New Mexico, Mississippi, Alabama, Oklahoma, and Florida are reported as 29%, 28%, 26%, 24%, and 23%, respectively, illustrating the extent of the uninsured vehicle problem across different states. Due to its large impact on public, there is an extensive public interest for an automated solution for detecting uninsured vehicles driving in traffic and to penalize a violator.

Conventionally, an uninsured motor vehicle can be detected utilizing an image-capturing unit already operating at, for example, a to booth/stop sign, highway, or red light. Such an image capturing unit, however, typically operates in conjunction with a sensor based triggering system installed beneath a road such as an induction loop, a weight sensor, or an in-ground sensor, etc. When a vehicle is detected by the traffic sensor, the image capturing unit is triggered to capture a snapshot of the vehicle.

FIG. 2 illustrates a prior art image capturing unit triggering system 150 having an induction loop traffic sensor 155. The induction loop traffic sensor 155 further includes an electrical meter 175, an underground electrical wire 165, and a system computer 170. When a vehicle 180 enters into the induction loop 155, the induction loop 155 generates an electromagnetic field 160 that creates current in the loop triggering the image capturing unit. Such traffic sensor 155 for triggering the image capturing unit requires high installation and maintenance costs. They are also invasive and require closing one or more lanes in an installation.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for methods and systems for detecting uninsured motor vehicles.

It is another aspect of the disclosed embodiments to provide for a method and system for detecting an uninsured motor vehicle driving in traffic.

It is a further aspect of the disclosed embodiments to provide for the acquisition of video from local roads, highways, tollbooths, red lights, intersections, etc.

Is another aspect of the disclosed embodiments to provide for the extraction of video frames when a vehicle is detected at a specific position with its license plate visible (i.e., video triggering).

It is yet another aspect of the disclosed embodiments to provide for the optional pruning of video frames extracted by video triggering.

It is also an aspect of the disclosed embodiments to provide for the performance of license plate detection/localization on extracted video frames.

It is yet a further aspect of the disclosed embodiments to provide for the performance of license plate recognition with respect to detected license plates.

It is also an aspect of the disclosed embodiments to provide for a determination of insurance associated with a detected vehicle from a database.

It another aspect of the disclosed embodiments to provide a means for sending a notification/ticket to the registrant of a vehicle, if the vehicle is identified as uninsured.

The aforementioned aspects and other objectives and advantages can now be achieved as described herein. Methods and systems are disclosed for detecting an uninsured motor vehicle. A video sequence can be continuously acquired at a predetermined frame rate and resolution by an image-capturing unit installed at a particular location (e.g., local road, highway, toll booth, red light, intersection, etc). A video frame can be extracted from the video sequence when a vehicle is detected at an optimal position for license plate recognition by detecting a blob corresponding to the vehicle and a virtual trap on an image plane. The video frame can be pruned to eliminate a false positive and multiple frames with respect to a similar vehicle before transmitting the frame via a network.

A license plate detection/localization operation can be performed with respect to the extracted video frame to identify a sub-region with respect to the video frame that is most likely to contain a license plate. A license plate recognition operation (e.g., character level segmentation and optical character recognition) can be performed on the detected license plate and an overall confidence assigned to a license plate recognition result. Insurance with respect to the detected vehicle can be checked from a database and a notification/ticket can then be automatically sent to a registrant of the vehicle, if the vehicle is identified as uninsured.

The video frame can be extracted by transferring a frame of interest (online) to a central processing unit for further processing and/or transferring the captured video sequence via a network (offline). The frame rate and resolution can be determined based on requirement of the video triggering and the ALPR unit. The image capturing unit can be, for example, a RGB or NIR image capturing unit. The blob detection can be performed utilizing a background subtraction and/or a motion detection technique. The background subtraction highlights an object in a foreground (within a region of interest) of the video sequence when a static image capturing unit is being used to capture the video feed.

An absolute intensity/color difference between the known background image and each image in the video sequence can be computed by the background removal when an image of the background without any foreground objects is available. Pixels for which the computed distance in the intensity/color space is small are classified as a background pixel. The motion detection can be performed by a temporal difference approach, a pixel-level optical flow approach, and/or a block-matching algorithm. The virtual trap can be computed to detect the vehicle at a specific position in the image capturing unit view. The trap can be defined by a virtual line, a polygon, and multiple virtual lines or polygons.

The false positives due to a cast shadow can be eliminated utilizing a machine learning approach and a shadow suppression technique. Shadow suppression eliminates portions of the blob that correspond to a shadow area. Alternatively, a shadow removal technique can be applied to remove the shadow portion of the detected vehicle blob. The multiple frames with respect to a similar vehicle can be preferably eliminated to meet the bandwidth requirements of the network and also reduces a computational load required in the ALPR. The confidence score can be used to determine whether the ALPR result is a candidate for automated processing or whether it requires manual validation/review. The database can be obtained from a department of motor vehicle or from an insurance company. When a warning/ticket is issued, the video frame extracted by the video triggering can also be attached to the ticket as evidence to prove that the vehicle was driving in traffic when uninsured.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a table depicting estimated number and rate of uninsured vehicles, in accordance with the disclosed embodiments;

DETAILED DESCRIPTION

Figure 2:
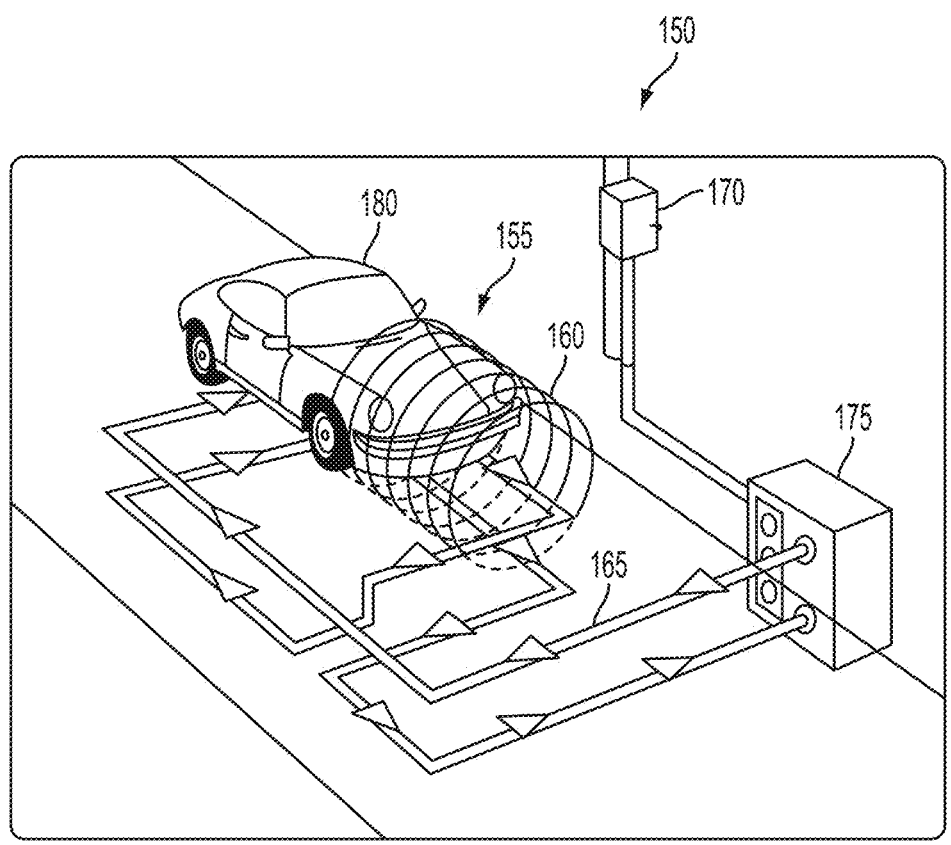
FIG. 2 illustrate a perspective view of a prior art image capturing unit triggering system based on an induction loop, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Rash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), wireless data network e.g., WiFi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 3:
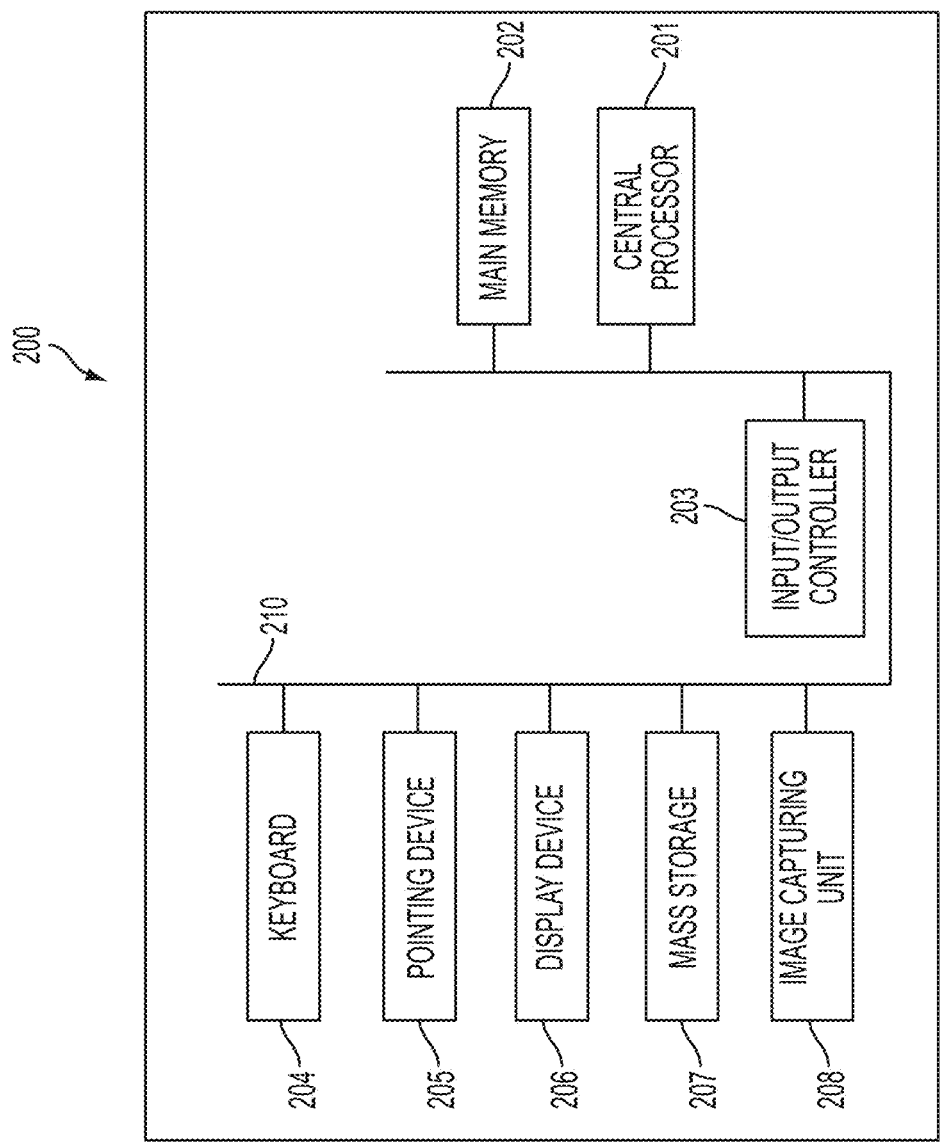
FIG. 3 illustrates a schematic view of a computer system, in accordance with the disclosed embodiments.
Figure 4:
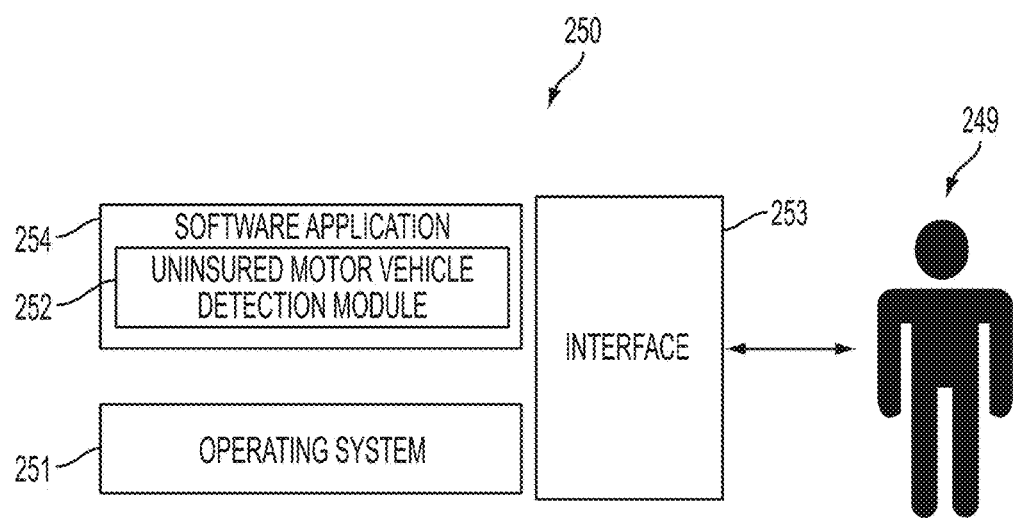
FIG. 4 illustrates a schematic view of a software system including an uninsured motor vehicle detection module, an operating system, and a user interface, in accordance with the disclosed embodiments.

FIGS. 3-4 are provided as exemplary diagrams of data-processing environments in which embodiments of the present invention may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 3, the disclosed embodiments may be implemented in the context of a data-processing system 200 that includes, for example, a central processor 201, a main memory 202, an input/output controller 203, a keyboard 204, an input device 205 (e.g., a pointing device, such as a mouse, track ball, and pen device, etc.), a display device 206, a mass storage 207 (e.g., a hard disk), an image capturing unit 208 and a USB (Universal Serial Bus) peripheral connection. As illustrated, the various components of the data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. It can be appreciated that the system 200 shown in FIG. 3 is discussed herein for illustrative purposes only and is not considered a limiting feature of the disclosed embodiments. Data-processing system 200 can be implemented as another computing device such as, for example, a server, a portable computing device, a Smartphone, a tablet computing device, laptop computer, Smartphone etc.

FIG. 4 illustrates a computer software system 250 for directing the operation of the data-processing system 200 depicted in FIG. 4. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system module 252 and/or software application 254.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 253, which is preferably a graphical user interface (GUI), also serves to display results, whereupon the user may supply additional inputs or terminate the session. In an embodiment, operating system 251 and interface 253 can be implemented in the context of a "Windows" system. It can be appreciated, of course, that other types of systems are possible. For example, rather than a traditional "Windows" system, other operation systems such as, for example, Linux may also be employed with respect to operating system 251 and interface 253. The software application 254 can include an uninsured motor vehicle detection module 252 for detecting an uninsured vehicle driving in traffic and penalizing a violator. Software application 254, on the other hand, can include instructions such as the various operations described herein with respect to the various components and modules described herein, such as, for example, the method 400 depicted in FIG. 6.

FIGS. 3-4 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 5:
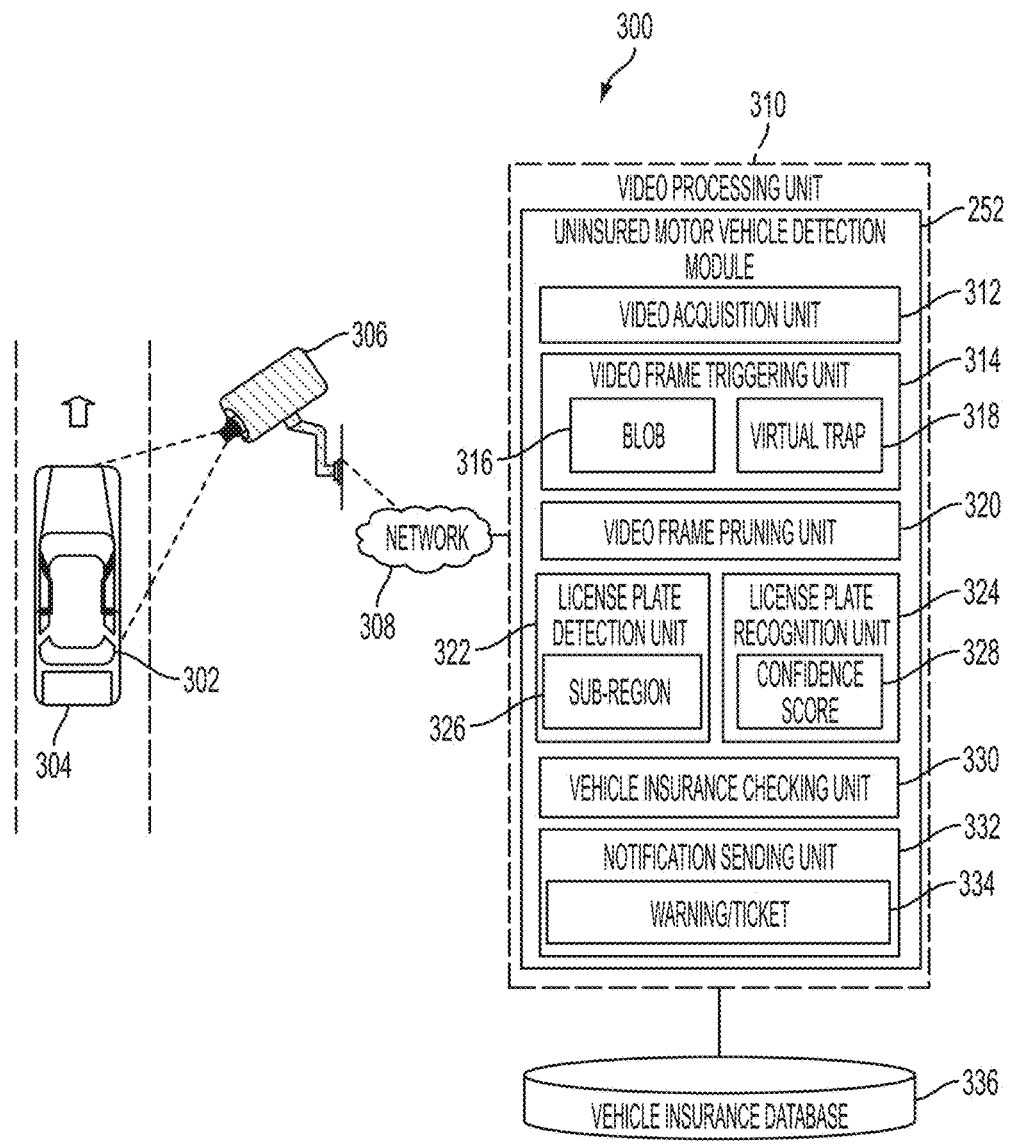
FIG. 5 illustrates a block diagram of an uninsured motor vehicle detection system, in accordance with the disclosed embodiments.

FIG. 5 illustrates a block diagram of an uninsured motor vehicle detection system 300, in accordance with the disclosed embodiments. Note that in FIGS. 3-21, identical or similar blocks are generally indicated by identical reference numerals. The uninsured motor vehicle detection system 300 can be configured to include the uninsured motor vehicle detection module 252. The uninsured motor vehicle detection module 252 generally includes a video acquisition unit 312, a video frame extracting/triggering unit 314, a video frame pruning unit 320, a license plate detection unit 322, and a license plate recognition unit 324. The uninsured motor vehicle detection module 252 further includes a vehicle insurance checking unit 330 and a notification sending unit 332 associated with a vehicle insurance database 336.

The video acquisition unit 312 continuously acquires a video sequence at a predetermined frame rate and a resolution by an image capturing unit 306 installed at a location such as, for example, local road, highway, toll booth, red light, intersection, etc. The image capturing unit 306 can be operatively connected to a video processing unit 310 via a network 308. Note that the image capturing unit 306 described in greater detail herein is analogous or similar to the image capturing unit 208 of the data-processing system 200, depicted in FIG. 3. The image capturing unit 306 may include built-in integrated functions such as image processing, data formatting, and data compression functions.

Note that the network 308 may employ any network topology, transmission medium, or network protocol. The network 308 may include connections such as wire, wireless communication links, or fiber optic cables. Network 308 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The image capturing unit 306 integrated with the image processing unit 310 continuously monitors traffic within an effective field of view. The image processing unit 310 receives the video sequence from the image capturing unit 306 in order to process the image 304. The image processing unit 310 is preferably a small, handheld computer device or palmtop computer as depicted in FIG. 3 that provides portability and is adapted for easy mounting. The image capturing unit 306 can be, for example, a RGB or NIR image capturing unit. NIR (Near Infrared) imaging capabilities can be employed for monitoring at night if desired, unless external sources of illumination are used. Inexpensive NIR image capturing units are readily available, as the low-end portion of the near-infrared spectrum (e.g., 700 nm-1000 nm) can be captured with the same equipment that captures visible light.

The video frame extraction/triggering unit 314 extracts a video frame from the video sequence by detecting a blob 316 corresponding to the vehicle 302 and a virtual trap 318 on an image plane when the vehicle 302 is detected at an optimal position for license plate recognition. The video frame pruning unit 320 prunes the video frame to eliminate a false positive and multiple frames with respect to a similar vehicle 302 before transmitting the frame via the network 308. The license plate detection unit 322 performs a license plate detection/localization on the extracted video frame to identify a sub-region 326 of the video frames that are most likely to contain the license plate 304. The license plate recognition unit 324 performs a character level segmentation (extracting images of each individual character in the license plate 304) and OCR and assigns an overall confidence score 328 to an ALPR result.

In general, ALPR (Automatic License Plate Recognition) systems often function as the core module of "intelligent" transportation infrastructure applications. License plate recognition can be employed to identify a vehicle by automatically reading a license plate utilizing an image processing and character recognition technology. A license plate recognition operation can be performed by locating the license plate in an image, segmenting the characters in the plate, and performing an OCR (Optical Character Recognition) operation with respect to the characters identified. The vehicle insurance checking unit 330 checks the insurance with respect to the detected vehicle 302 from a database 336 and a notification sending unit 332 sends a notification/ticket to a registrant of the vehicle 302, if the vehicle 302 is identified as uninsured.

Figure 6:
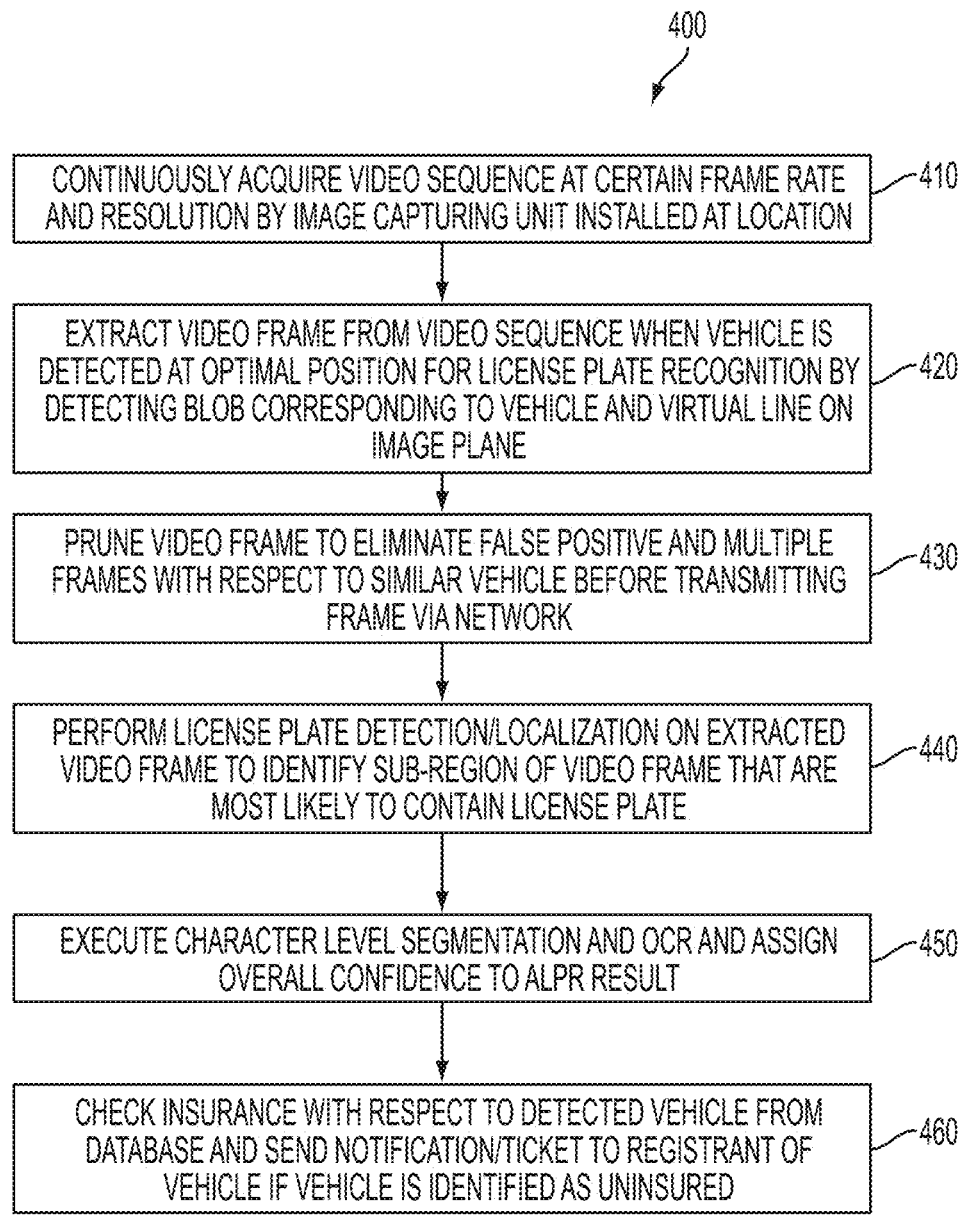
FIG. 6 illustrates a high level flow chart of operations illustrating logical operational steps of method for detecting an uninsured motor vehicle driving in traffic, in accordance with the disclosed embodiments.

FIG. 6 illustrates a high level flow chart of operations illustrating logical operational steps of method 400 for detecting uninsured motor vehicles 302 driving in traffic, in accordance with a preferred embodiment. As depicted at block 410, a step or logical operation can be implemented in which the video sequence is continuously acquired at a predetermined frame rate and resolution via the image-capturing unit 306. The data acquisition unit 312 can acquire data continuously at a particular frame rate and resolution via the image-capturing unit 306. The frame rate and resolution can be determined based on the requirements of the video frame extracting unit 314 and the license plate recognition unit 324.

As shown next at block 420, a step or logical operation can be implemented in which the video frame is extracted from the video sequence when the vehicle 302 is detected at the optimal position for license plate recognition by detecting the blob 316 corresponding to the vehicle 302 and the virtual trap 318 on the image plane. The blob 316 can be detected on the image plane corresponding to the vehicle 302 in the image capturing unit 306 view. The blob detection 316 can be performed utilizing a background subtraction and/or a motion detection technique.

Figure 7:
FIGS. 7-9 illustrate a video frame showing a detected blob corresponding to a vehicle utilizing a motion detection algorithm and a background subtraction, in accordance with the disclosed embodiments.
Figure 8:
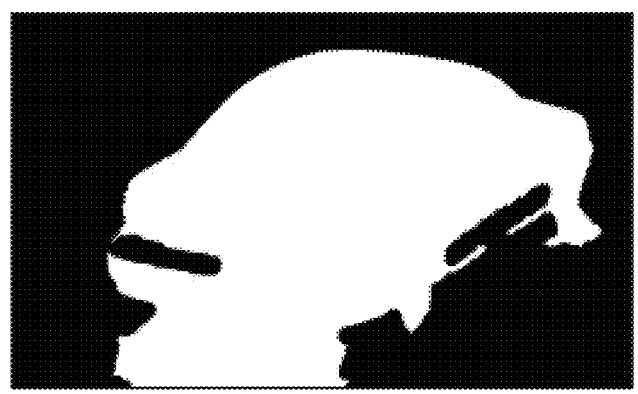
Figure 9:
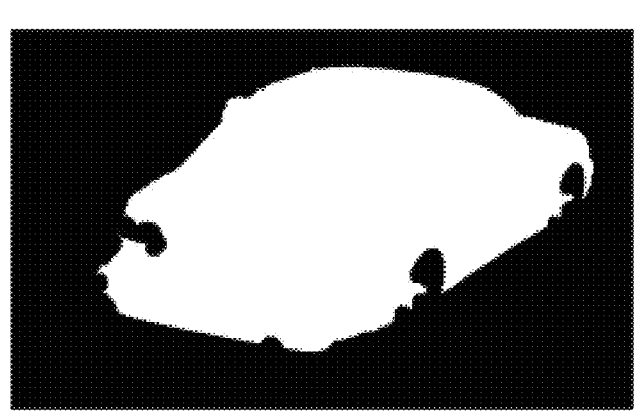

FIGS. 7-9 illustrate video frames 500, 525, and 550 indicating a detected blob corresponding to a vehicle utilizing the motion detection algorithm and the background subtraction, in accordance with the disclosed embodiments. FIG. 9 illustrates a background subtraction 550 that can be employed to highlight an object in a foreground (within a region of interest) of the video sequence 500 when a static image capturing unit is being utilized to capture the video feed. When the image of the background without any foreground objects is available, background removal computes an absolute intensity/color difference between the known background image and each image in the video sequence. Pixels for which the computed distance in the intensity/color space is small can be classified as the background pixels. The background estimation can be computed based on Gaussian mixture models, Eigen backgrounds which use principal component analysis, or computation of running averages that gradually update the background as new frames as acquired.

Motion detection 525 detects the blob 316 corresponding to the vehicle 302 within the region of interest from the video. Temporal difference methods, for example, subtract subsequent video frames followed by thresholding to detect regions of change. Motion regions in the video sequence can also be extracted utilizing a pixel-level optical flow method or a block-matching algorithm. Motion detection 525 as shown in FIG. 8 can be computed utilizing a temporal difference method (specifically double frame difference) in conjunction with a morphological operation for the vehicle 302 detection within the ROI.

Figure 10:
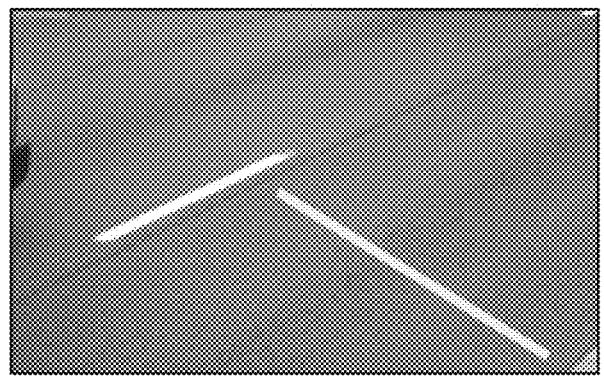
FIGS. 10-12 illustrate virtual traps to detect the vehicle at a specific position in the image capturing unit view utilizing a virtual line, polygon, and multiple virtual lines, in accordance with the disclosed embodiments.
Figure 11:
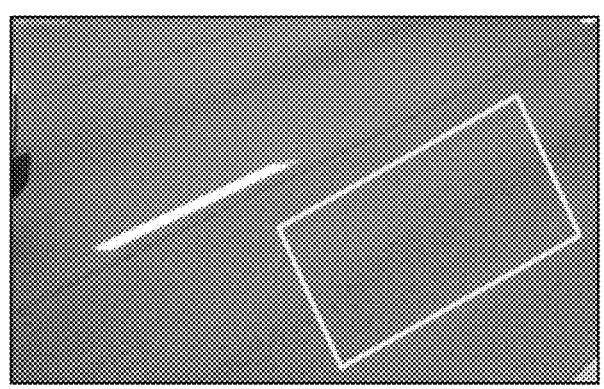
Figure 12:
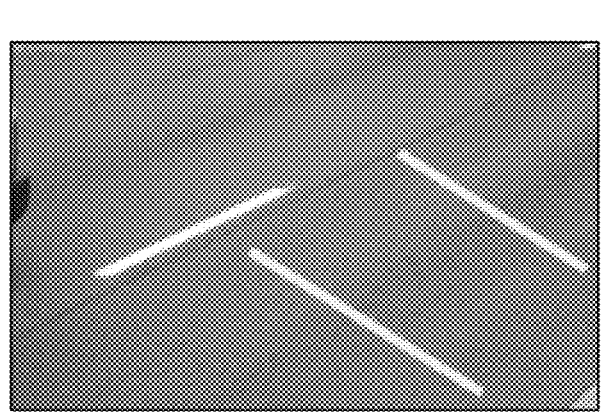

FIGS. 10-12 illustrate virtual traps 318 to detect the vehicle 302 at a specific position in the image capturing unit view utilizing a virtual line 600, a polygon 630, and multiple virtual lines 690, in accordance with the disclosed embodiments. Once the blob 316 corresponding to the vehicle 302 is detected on the image plane, the frame can be identified when the vehicle 302 is at the position with visible license plate 304. This can be achieved by defining the virtual trap 318 on the image plane. The virtual trap 318 can be defined by the virtual line 600, the virtual polygon 630, and multiple virtual lines 690 or polygons as shown in FIGS. 10-12.

Figure 13:
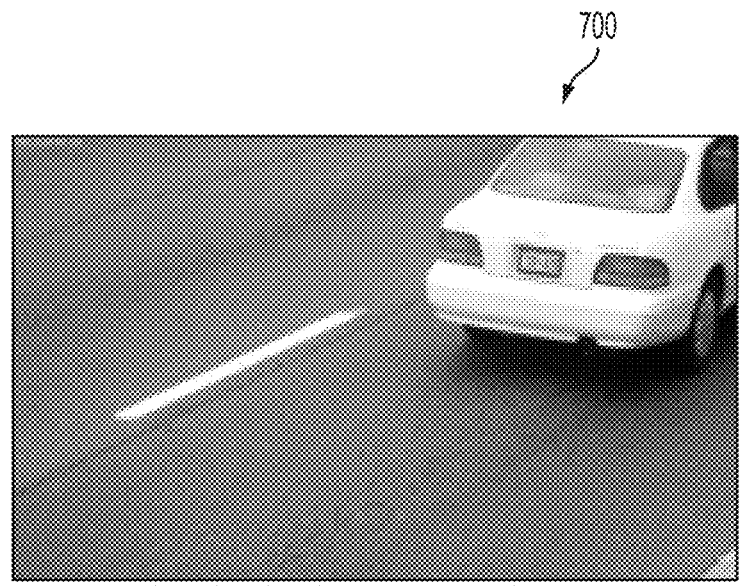
FIGS. 13-14 illustrate a video frame and a motion blob exiting a virtual line, in accordance with the disclosed embodiments.
Figure 14:
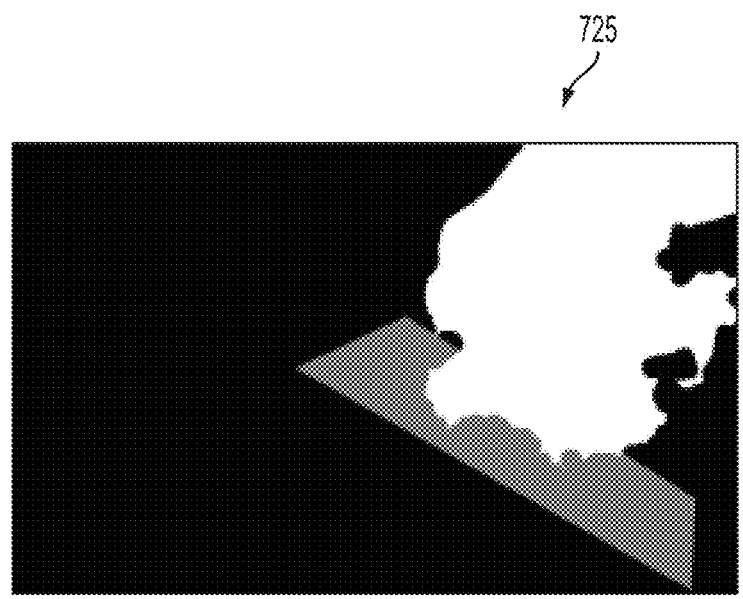

FIGS. 13-14 illustrate a video frame 700 and a motion blob exiting a virtual line 725, in accordance with the disclosed embodiments. As the vehicle 302 moves across the virtual line 600, the number of pixels from the vehicle blob 316 will overlap or intersect the virtual line 600. The frame can be extracted from the video when the vehicle blob 316 is active for the last time on the virtual line 600 after subsequent frames with active vehicle blobs 316 on the line 600. In this case, all the active vehicle 302 pixels will be on one side of the line 600 as shown in FIG. 13-14. The process can be detected by counting the number of vehicle pixels before, on, and after the virtual line 600 and comparing each of counts with pre-defined thresholds.

Assuming $T_1$, $T_2$, and $T_3$ represent the thresholds for the number of pixels before, on, and after the virtual line 600, respectively, the frame can be extracted if the vehicle blob 316 has less than $T_1$ pixels before the virtual line 600, more than $T_2$ pixels on the virtual line 600, and has more than $T_3$ pixels after the virtual line 600. If the counts meet the thresholds, the frame can be extracted from the video. Note that the values of the thresholds depends on the image capturing unit 306 geometry, frame rate, and video resolution, which can be determined in the image capturing unit 306 installation.

The virtual polygon 630 defined on the image plane detects the vehicle 302 at a specific position by defining two thresholds. The threshold $T_4$ defines the smallest number of vehicle pixels inside the virtual polygon 630 and the threshold $T_5$ defines the smallest number of consecutive frames on which at least $N_4$ vehicle pixels are inside the virtual polygon 630. The frame can be extracted from the video the first time it does not meet the first threshold and after subsequent frames it meets both thresholds.

Figure 15:
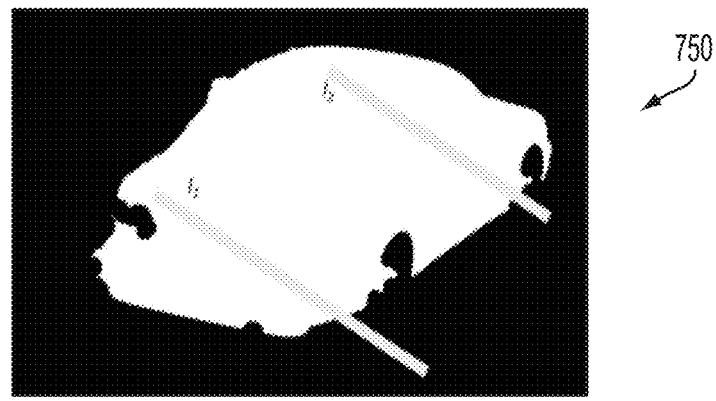
FIG. 15 illustrates a video triggering utilizing multiple virtual lines, in accordance with the disclosed embodiments.

FIG. 15 illustrates the video triggering utilizing the multiple virtual lines 750, in accordance with the disclosed embodiments. FIG. 15 illustrates the detected vehicle blob and the two virtual lines $l_1$ and $l_2$ defined on the image plane. The frame can be extracted by comparing the number of the vehicle pixels before the first line $l_1$, between the first and second line, and after the second line $l_2$ with pre-defined thresholds. If the thresholds are met, the frame can be extracted from the video. This idea can be generalized to more than two virtual lines by defining convenient thresholds for each region between the lines. Similarly, multiple virtual polygons 630 can be defined and utilized for detecting the vehicle 302 at the specific position.

The video frame can be pruned to eliminate the false positive and multiple frames with respect to a similar vehicle 302 before transmitting the frame via the network 308, as shown at block 430. The video triggering described in the preceding section may cause false positives in certain conditions. One of these cases can be illustrated in FIG. 16 where the shadow of the vehicle 302 driving in the next lane is caught by the virtual trap.

Figure 16:
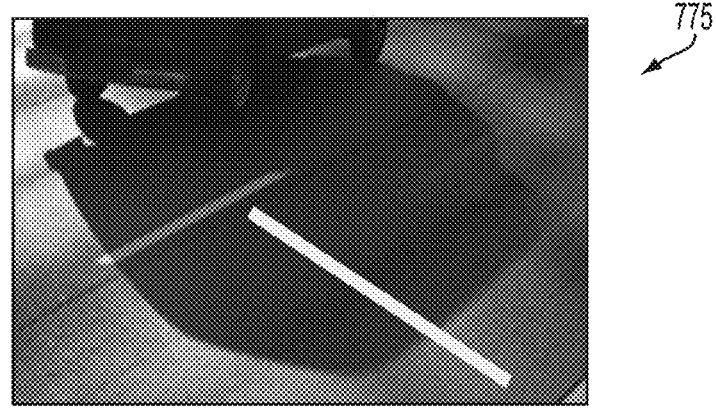
FIG. 16 illustrates a video frame showing a false positive caused by a shadow of the vehicle in a next lane, in accordance with the disclosed embodiments.

FIG. 16 illustrates a video frame 775 showing a false positive caused by a shadow of the vehicle in a next lane, in accordance with the disclosed embodiments. The false positive can be optionally eliminated before transferring them through the network 308. The false positive due to a cast shadow can be eliminated utilizing a machine learning approach and a shadow suppression technique, where a set of features can be calculated from positive and negative samples and a linear/non-linear classifier can be trained utilizing the calculated features.

The trained classifier can then be utilized in an online phase to eliminate the false positives detected by the video triggering. Shadow suppression eliminates portions of the blob that correspond to shadow areas. Alternatively, the shadow removal technique can be applied to remove the shadow portion of the detected vehicle blob. The multiple frames with respect to a similar vehicle 302 can be preferably eliminated to meet the bandwidth requirements of the network 308 and also reduces the computational load required in the ALPR unit 324.

Figure 17:
FIGS. 17-18 illustrate extracted frames by the video triggering with respect to a similar vehicle, in accordance with the disclosed embodiments.
Figure 18:
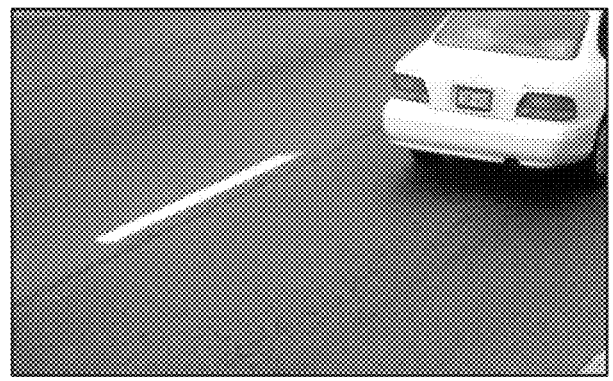

FIGS. 17-18 illustrate extracted frames 800 and 825 by the video triggering with respect to a similar vehicle, in accordance with the disclosed embodiments. Multiple frames with respect to a similar vehicle can occur when the vehicle 302 stops and moves again and is in view of the image capturing. Such frames 800 and 825 can be preferably eliminated to meet bandwidth requirements of the network 308 and also reduces a computational load required in the ALPR unit 324. For example, FIGS. 17-18 shows the frames 800 and 825 from 20 fps video extracted for a similar vehicle 302 by the video extracting unit 314. Such frames 800 and 825 can be eliminated by checking the frame number of consecutively extracted frames by the video triggering. If the difference between the frame numbers between two consecutively extracted frames is less than the pre-defined threshold, the later can be eliminated.

The license plate detection/localization can be performed on the extracted video frame to identify the sub-region 326 of the video frame that are most likely to contain the license plate 304, as depicted at block 440. Such an approach identifies the sub-region(s) 326 of each of the captured video frames that are most likely to contain the license plate 304 utilizing a morphological filtering and connected component analysis (CCA). The plate detection step in the license plate recognition unit 324 utilizes the combination of the image-based classification to identify and rank, based on the confidence score 328, with respect to the likely plate regions in the overall image 304.

Detecting the local sub-image regions 326 that are likely to contain license plates 304 helps restrict the computational overhead for subsequent processing steps like character segmentation and optical character recognition (OCR). The plate recognition unit 324 can also be utilized to generate the overall confidence value 328 for the extracted video frame. This confidence indicates the likelihood that the frame actually contains the license plate 304 and can be utilized to eliminate some false alarms arising from the video triggering unit 314.

The character level segmentation (extracting images of each individual character in the license plate 304) and OCR can be performed and the overall confidence score 328 can be assigned to the ALPR result, as indicated at block 450. Based on the success of the segmentation and OCR steps, the overall confidence score 328 can be assigned to the ALPR (automated license plate recognition) result. For most ITS applications (e.g., automated tolling), the confidence score 328 can be utilized to determine whether the ALPR result is a candidate for automated processing or whether it requires manual validation/review. For the uninsured motorist detection application, the ALPR confidence score 328 can likewise be used as a key to determine whether or not the license plate 304 results can continue on to next step of checking the insurance of the detected vehicle 302 from the database 326 in the uninsured motor vehicle detection process.

Insurance with respect to the detected vehicle 302 can be checked from the database 336 and the notification/ticket can be sent to the registrant of the vehicle 302, if the vehicle 302 is identified as uninsured, as described at block 460. After recognizing the license plate 304 by the ALPR unit 324, insurance of the vehicle 302 can be checked from the database 336. The database 336 can be obtained from department of motor vehicles 302 or from insurance companies. When the uninsured vehicle 302 is detected, the notification can be sent to authorized entities. The authorized entities either send the warning or the ticket to the registrant of the vehicle 302. When the warning/ticket is issued, the video frame extracted by the video triggering can also be attached to the ticket as the evidence to prove that the vehicle 302 is driving in traffic when uninsured.

Figure 19:
FIG. 19 illustrates a field view of the image capturing unit, in accordance with the disclosed embodiments.

FIG. 19 illustrates a field view of the image capturing unit 850, in accordance with the disclosed embodiments. For example, the video triggering portion can be tested on a video sequence captured in Baltimore. The captured video possess a resolution of 1280×720 and the frame rate of 20 frames per second (fps). The video is captured on a local road from 8.30 AM in the morning till 2.30 PM in the afternoon. The speed of the vehicles 302 crossing FOV of the image capturing units 306 varies depending on the time of the day and congestion in the traffic. The region of interest can be defined as a right most lane that are closest to the image capturing units 306 and the performance of the algorithm for the vehicles 302 traveling along this lane can be tested. After manually inspecting the video, it is counted that 1,226 vehicles 302 pass across the scene in the right most lanes. This forms the ground truth and the video triggering can be implemented by defining the virtual trap on the image plane.

Figure 20:
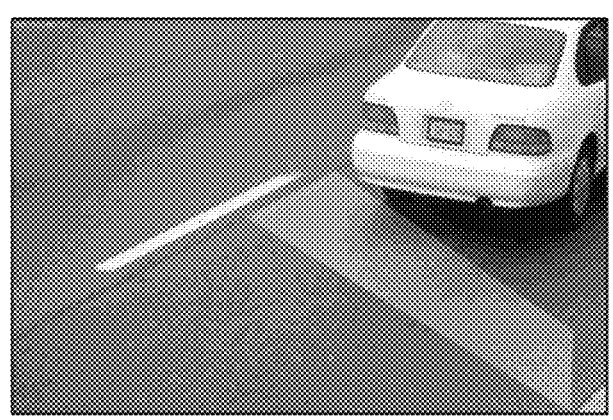
FIG. 20 illustrates a defined virtual trap (a light gray area) on an image plane, in accordance with the disclosed embodiments.

FIG. 20 illustrates a defined virtual trap (a light gray area) 875 on an image plane, in accordance with the disclosed embodiments. Instead of defining a thin line as the virtual trap, the virtual trap (or virtual polygon) can be deliberately defined as a thick line not to miss the vehicle 302 with high speed. The thresholds for $T_1$, $T_2$, and $T_3$ can be set as 0, 100, and 500, respectively.

Figure 21:
FIG. 21 illustrates video frames with false positives detected by the video triggering, in accordance with the disclosed embodiments.

FIG. 21 illustrates video frames 900 with false positives detected by the video triggering, in accordance with the disclosed embodiments. The performance of the vehicle triggering algorithm is shown in Table 1.

TABLE 1

| | Total Number of Frames In The Video | Number of Vehicles Crossing The Scene | Number of Misses | Number of False Alarms |
|---|---|---|---|---|
| Before Pruning | 440,677 | 1,226 | 29 | 2,214 |
| After Pruning | 440,677 | 1,226 | 29 | 19 |

In the example Table 1 indicated above, the data indicates that video triggering missed only 29 vehicles out of 1,226 vehicles 302 crossing the scene and caused 2,214 false detections out of 440,677 frames. Such false positives are mainly assigning multiple frames for similar vehicle 302. The number of false positives can be reduced down to, for example, 19, when pruning performed on extracted frames based on the frame number of the consecutively extracted frames. Note that false detection may occur if the license plate 304 of the vehicle 302 is not seen in the extracted video frame. Some examples of the false detections after pruning are depicted in FIG. 21.

Based on the foregoing, it can be appreciated that a number of embodiments, preferred and alternative, are disclosed herein. For example, in one embodiment, a method can be implemented for detecting an uninsured motor vehicle. Such a method can include the steps or logical operations of, for example: continuously acquiring a video sequence at a predetermined frame rate and resolution by an image-capturing unit installed at a location to extract a video frame from the video sequence when a vehicle is detected at an optimal position for license plate recognition; detecting/localizing the license plate on the extracted video frame to identify a sub-region with respect to the video frame that includes a license plate; performing a license plate recognition utilizing a character level segmentation and an optical character recognition and assigning an overall confidence to a license plate recognition result; and identifying insurance with respect to a detected vehicle from a database and thereafter automatically sending a notification/ticket to a registrant of the vehicle, if the vehicle is identified as uninsured.

In another embodiment, a step or logical operation can be provided for pruning the video frame to eliminate a false positive and multiple frames with respect to a similar vehicle before transmitting the video frame via a network. In yet another embodiment, a step or logical operation can be provided for extracting the video frame by transferring a frame of interest to a central processing unit for further processing. In still another embodiment, a step or logical operation can be implemented for extracting the video frame in the central processing unit after transferring the video sequence via a network.

In another embodiment, a step or logical operation can be provided for determining the frame rate and resolution based on requirements of a video frame triggering unit and a license plate recognition unit. In some embodiments, the image capturing unit may be an RGB image capturing unit and/or an near infra-red image capturing unit.

In another embodiment, a step or logical operation of detecting/localizing the license plate on the extracted video frame can further include a step or logical operation for detecting a blob corresponding to the vehicle on an image plane utilizing a background subtraction and/or a motion detection technique.

In another embodiment, the background subtraction step or logical operation can involve steps or logical operations for highlighting an object in the video sequence when a static image-capturing unit is employed to capture the video sequence; computing an absolute intensity/color difference between a known background image and each image in the video sequence by a background removal when an image of a background without any foreground object is available; and classifying a pixel for which a computed distance in an intensity/color space is small as a background pixel.

In still another embodiment, a step or logical operation can be provided for performing the motion detection by a temporal difference approach, a pixel-level optical flow approach, and/or a block-matching algorithm. In another embodiment, the step or logical operation of detecting/localizing the license plate on the extracted video frame can further include steps or logical operations for computing a virtual trap to detect the vehicle at a specific position in the image capturing unit view; and defining the trap by a virtual line, a polygon, and a plurality of virtual lines and polygons.

In still another embodiment, a step or logical operation can be provided for eliminating the false positive due to a cast shadow utilizing a machine learning approach and a shadow suppression technique. In another embodiment, a step or logical operation can be implemented for eliminating the multiple frames with respect to a similar vehicle to meet a bandwidth requirement of the network and also to reduce a computational load required in the license plate recognition unit.

In another embodiment, steps or logical operations can be provided for applying a shadow removal technique to remove a shadow portion of the detected vehicle blob; and determining whether the license plate recognition result is a candidate for an automated processing and/or requires a manual validation by the confidence score. In another embodiment, a step or logical operation can be provided for obtaining the database from a department of motor vehicle and/or from an insurance company. In yet another embodiment, a step or logical operation can be provided for attaching the video frame extracted to the ticket as an evidence to prove that the vehicle is driving in traffic when uninsured.

In another embodiment, a system can be provided for detecting an uninsured motor vehicle. Such a system can include, for example, one or more processors and a memory (or multiple memories or databases) including instructions stored therein, which when executed by the one or more processors, cause the one or more processors to perform operations including, for example, continuously acquiring a video sequence at a predetermined frame rate and resolution by an image-capturing unit installed at a location to extract a video frame from the video sequence when a vehicle is detected at an optimal position for license plate recognition; detecting/localizing the license plate on the extracted video frame to identify a sub-region with respect to the video frame that includes a license plate; performing a license plate recognition utilizing a character level segmentation and an optical character recognition and assigning an overall confidence to a license plate recognition result; and identifying insurance with respect to a detected vehicle from a database and thereafter automatically sending a notification/ticket to a registrant of the vehicle, if the vehicle is identified as uninsured.

In another embodiment, a machine-readable medium can include instructions stored therein, which when executed by a machine, cause the machine to perform operations including, for example, continuously acquiring a video sequence at a predetermined frame rate and resolution by an image-capturing unit installed at a location to extract a video frame from the video sequence when a vehicle is detected at an optimal position for license plate recognition detecting/localizing the license plate on the extracted video frame to identify a sub-region with respect to the video frame that includes a license plate performing a license plate recognition utilizing a character level segmentation and an optical character recognition and assigning an overall confidence to a license plate recognition result; and identifying insurance with respect to a detected vehicle from a database and thereafter automatically sending a notification/ticket to a registrant of the vehicle, if the vehicle is identified as uninsured.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for detecting an uninsured motor vehicle, said method comprising:

continuously acquiring a video sequence at a predetermined frame rate and resolution by an image-capturing unit installed at a location to extract a video frame from said video sequence when a vehicle is detected at an optimal position for license plate recognition, wherein said image-capturing unit communicates with a video processing unit through a computer network, said video processing unit comprising a video frame triggering unit;

detecting and localizing said license plate on said extracted video frame to identify a sub-region in a region of interest of said video frame that includes a license plate;

performing a license plate recognition with respect to said license plate detected and localized on said extracted video frame utilizing a character level segmentation and an optical character recognition and assigning an overall confidence to a license plate recognition result with respect to said extracted video frame, said overall confidence indicative of a likelihood that said extracted video frame contains said license plate and that said extracted video frame is capable of eliminating at least some false alarms arising from said video frame triggering unit, and wherein said overall confidence is assigned based on a success of said character level segmentation and said optical character recognition; and identifying insurance with respect to a detected vehicle from a vehicle insurance database after said detecting and localizing said license plate on said extracted video frame and after said performing said license plate recognition with respect to said license, plate detected and localized on said extracted video frame, and thereafter automatically sending a notification/ticket to a registrant of said vehicle, if said vehicle is identified as uninsured.

2. The method of claim 1 further comprising pruning said video frame to eliminate a false positive and multiple frames with respect to a vehicle similar to said vehicle detected at said optimal position before transmitting said video frame via a network and prior to said detecting and localizing said license plate on said extracted video frame.

3. The method of claim 2 further comprising extracting said video frame by transferring a frame of interest to a central processing unit for further processing and wherein said video frame triggering unit accomplishes video triggering utilizing a plurality of virtual lines, said vide processing unit comprising said central processing unit.

4. The method of claim 3 further comprising determining said frame rate and resolution based on requirements of said video frame triggering unit and a license plate recognition unit and wherein said plurality of virtual lines comprise two virtual lines defined on image plane.

5. The method of claim 4 wherein said image capturing unit comprises an RGB image capturing unit and a near infra-red image capturing unit and wherein said computer network includes a collection of networks and gateways that utilize a Transmission Control Protocol/Internet Protocol (TCP/IP) suite of protocols to communicate with one another.

6. The method of claim 4 further comprising obtaining said database from a department of motor vehicle and from an insurance company.

7. The method of claim 3 wherein said detecting and localizing said license plate on said extracted video frame, further comprises:
computing a virtual trap to detect said vehicle at a specific position in said image capturing unit view; and
defining said trap by a virtual line, a polygon, and said plurality of virtual lines and a plurality of virtual polygons.

8. The method of claim 7 further comprising performing said motion detection by a temporal difference approach, a pixel-level optical flow approach, and a block-matching algorithm.

9. The method of claim 3 further comprising eliminating said false positive due to a cast shadow utilizing a machine learning approach and a shadow suppression technique.

10. The method of claim 2 further comprising extracting said video frame in said central processing unit after transferring said video sequence via said computer network, wherein said computer network is operably connected to said video processing unit that comprises a video acquisition unit, said video frame triggering unit, and a video frame pruning unit.

11. The method of claim 3 wherein said detecting and localizing said license plate on said extracted video frame, further comprises:
detecting a blob corresponding to said vehicle on an image plane of said region of interest utilizing a background subtraction and a motion detection technique in which motion regions in said video frame are extracted utilizing at least one of a pixel-level optical flow method or a block-matching algorithm; and
computing motion detection with said motion detection technique utilizing a temporal different method in conjunction with a morphological operation for vehicle detection in said region of interest, wherein said temporal difference method comprises double frame difference.

12. The method of claim 11 wherein said background subtraction, further comprises:
highlighting an object in said video sequence when a static image-capturing unit is employed to capture said video sequence;
computing an absolute intensity/color difference between a known background image and each image in said video sequence by a background removal when an image of a background without any foreground object is available; and
classifying a pixel for which a computed distance in an intensity/color space is small as a background pixel.

13. The method of claim 12 further comprising performing said motion detection by a temporal difference approach, a pixel-level optical flow approach, and a block-matching algorithm.

14. The method of claim 11 further comprising:
applying a shadow removal technique to remove a shadow portion of said blob detected utilizing said background subtraction and said motion detection technique, said blob comprising a vehicle blob and wherein said blob is processed by said video frame triggering unit; and
determining whether said license plate recognition result is a candidate for an automated processing and requires a manual validation by said confidence score.

15. The method of claim 2 further comprising attaching said video frame extracted to said ticket as an evidence to prove that said vehicle is driving in traffic when uninsured.

16. A system for detecting an uninsured motor vehicle, said system comprising:
at least one processor; and
memory comprising instructions stored therein, which when executed by said at least one processor, causes said at least one processor to perform operations comprising:
continuously acquiring a video sequence at a predetermined frame rate and resolution by an image-capturing unit installed at a location to extract a video frame from said video sequence when a vehicle is detected at an optimal position for license plate recognition, wherein said image-capturing unit communicates with a video processing unit through a computer network, said video processing unit comprising a video frame triggering unit;
detecting and localizing said license plate on said extracted video frame to identify a sub-region in a region of interest of said video frame that includes a license plate;
performing a license plate recognition with respect to said license plate detected and localized on said extracted video frame utilizing a character level segmentation and an optical character recognition and assigning an overall confidence to a license plate recognition result with respect to said extracted video frame, said overall confidence indicative of a likelihood that said extracted video frame contains said license plate and that said extracted video frame is capable of eliminating at least some false alarms arising from said video frame triggering unit, and wherein said overall confidence is assigned based on a success of said character level segmentation and said optical character recognition; and
identifying insurance with respect to a detected vehicle from a vehicle insurance database after said detecting and localizing said license plate on said extracted video frame and after said performing said license plate recognition with respect to said license plate detected and localized on said extracted video frame, and thereafter automatically sending a notification/ticket to a registrant of said vehicle, if said vehicle is identified as uninsured.

17. The system of claim 16 wherein said operations further comprise pruning said video frame to eliminate a false positive and multiple frames with respect to a vehicle similar to said vehicle detected at said optimal position before transmitting said video frame via a network and prior to said detecting and localizing said license plate on said extracted video frame.

18. The system of claim 17 wherein said operations further comprise:
   extracting said video frame by transferring a frame of interest to a central processing unit for further processing and wherein said video frame triggering unit accomplishes video triggering utilizing a plurality of virtual lines; and
   wherein said operations for detecting and localizing said license plate on said extracted video frame further comprises operations for: detecting a blob corresponding to said vehicle on an image plane of said region of interest utilizing a background subtraction and a motion detection technique in which motion regions in said video frame are extracted utilizing at least one of a pixel-level optical flow method or a block-matching algorithm; and computing motion detection with said motion detection technique utilizing a temporal different method in conjunction with a morphological operation for vehicle detection in said region of interest, wherein said temporal difference method comprises double frame difference.

19. The system of claim 17 wherein said operations further comprise:
   extracting said video frame in said central processing unit after transferring said video sequence via said computer network, wherein said computer network is configured to be operably connected to said video processing unit that comprises a video acquisition unit, said video frame triggering unit, and a video frame pruning unit.

20. A non-transitory machine-readable medium comprising instructions stored therein, which when executed by a machine, cause the machine to perform operations comprising:

continuously acquiring a video sequence at a predetermined frame rate and resolution by an image-capturing unit installed at a location to extract a video frame from said video sequence when a vehicle is detected at an optimal position for license plate recognition, wherein said image-capturing unit communicates with a video processing unit through a computer network, said video processing unit comprising a video frame triggering unit;

detecting and localizing said license plate on said extracted video frame to identify a sub-region in a region of interest of said video frame that includes a license plate;

performing a license plate recognition with respect to said license plate detected and localized on said extracted video frame utilizing a character level segmentation and an optical character recognition and assigning an overall confidence to a license plate recognition result with respect to said extracted video frame, said overall confidence indicative of a likelihood that said extracted video frame contains said license plate and that said extracted video frame is capable of eliminating at least some false alarms arising from a video frame triggering unit, and wherein said overall confidence is assigned based on a success of said character level segmentation and said optical character recognition; and identifying insurance with respect to a detected vehicle from a vehicle insurance database after detecting and localizing said license plate on said extracted video frame and after performing said license plate recognition with respect to said license plate detected and localized on said extracted video frame, and thereafter automatically sending a notification/ticket to a registrant of said vehicle, if said vehicle is identified as uninsured.

* * * * *